(12) United States Patent
Tucker

(10) Patent No.: US 6,811,259 B2
(45) Date of Patent: Nov. 2, 2004

(54) PRINTING COLORED CONTACT LENSES

(75) Inventor: Robert Carey Tucker, Arlington Heights, IL (US)

(73) Assignee: Novartis AG, Basel (CH)

( * ) Notice: Subject to any disclaimer, the term of this patent is extended or adjusted under 35 U.S.C. 154(b) by 149 days.

(21) Appl. No.: 09/879,013

(22) Filed: Jun. 12, 2001

(65) Prior Publication Data

US 2001/0050753 A1 Dec. 13, 2001

Related U.S. Application Data

(60) Provisional application No. 60/213,217, filed on Jun. 20, 2000, and provisional application No. 60/211,024, filed on Jun. 12, 2000.

(51) Int. Cl.[7] ............................. G02B 7/02; G02B 7/04
(52) U.S. Cl. ...................................... 351/177; 351/162
(58) Field of Search ........................... 351/162, 160 R, 351/160 H, 161, 177

(56) References Cited

U.S. PATENT DOCUMENTS

| | | | |
|---|---|---|---|
| 4,038,264 A | 7/1977 | Rostoker et al. | 260/79.3 |
| 4,981,487 A | 1/1991 | da Costa | 8/507 |
| 5,352,887 A | * 10/1994 | Morgan et al. | 250/222.1 |
| 5,926,195 A | 7/1999 | Domhoff et al. | 347/87 |
| 6,284,161 B1 | 9/2001 | Thakrar et al. | 264/1.7 |
| 6,315,410 B1 | 11/2001 | Doshi | 351/162 |
| 2003/0025873 A1 | * 2/2003 | Ocampo | 351/162 |
| 2003/0030772 A1 | * 2/2003 | Ocampo | 351/162 |

FOREIGN PATENT DOCUMENTS

| | | | |
|---|---|---|---|
| EP | 0272 101 A2 | 12/1987 | C08J/3/20 |
| EP | 0272 101 A3 | 12/1987 | C08J/3/20 |
| EP | 0 482 836 A1 | 4/1992 | |
| EP | 0 482 837 A1 | 4/1992 | |
| EP | 0 482 837 B1 | 3/1995 | |
| JP | 8112566 | 5/1996 | |

* cited by examiner

Primary Examiner—Jordan M. Schwartz
(74) Attorney, Agent, or Firm—Jian Zhou; Robert J. Gorman; R. Scott Meece

(57) ABSTRACT

A method of making a colored contact lens comprises printing at least one layer of a colorant onto a contact lens using a printing process selected from the group consisting of ink jet printing, electrophotographic printing, thermal transfer printing, and photographic development printing. Printing can be done directly on the contact lens, on a film in a mold where the contact lens is formed, or on a cliché pad. Multiple layers of colorants can be printed onto a contact lens.

41 Claims, 2 Drawing Sheets

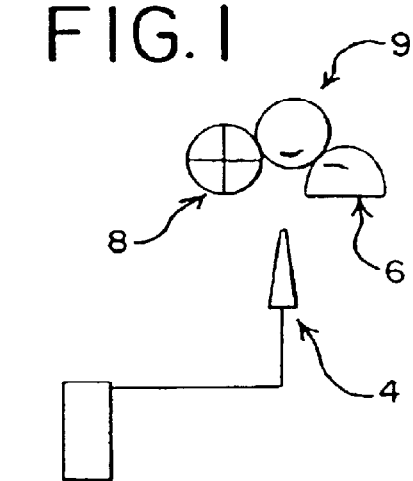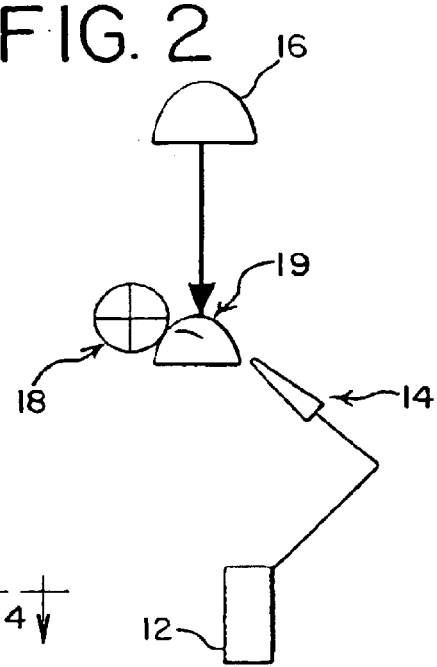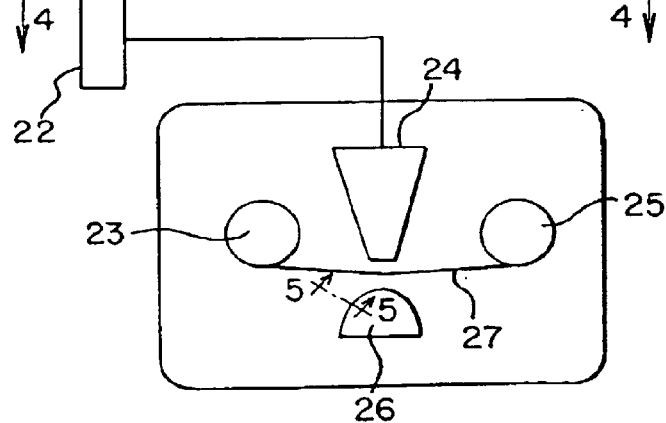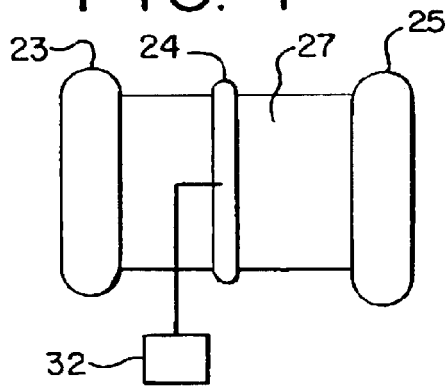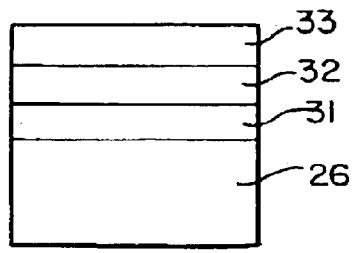

PRINTING COLORED CONTACT LENSES

This application claims under 35 U.S.C. § 119(e) the benefit of the filing date of U.S. Provisional Patent Application Ser. No. 60/213,217 filed Jun. 20, 2000 and of U.S. Provisional Patent Application Ser. No. 60/211,024 filed Jun. 12, 2000.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer.

Presently, methods of printing inks onto contact lenses involve cliché ink transfer printing. A typical example of this printing follows. An image is etched into metal to form a cliché. The cliché is placed on a printer. Once on the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicon that can vary in elasticity. The properties of the silicone material permit the inks to stick to the pad temporarily and fully release from the pad when it contacts the contact lens.

There are several disadvantages associated with using cliché ink transfer printing to color contact lenses. This method lacks consistency. Slight differences in the silicone pad can cause wide variation in image quality, effecting dot resolution and color reproducibility. Further, multiple color layering is difficult and time consuming. Further still, the design and printing process using this method is slow. After an image is fully designed, it can take about two weeks before that image is etched onto a cliché. The set-up is painstakingly detailed and lengthy when more than one color is going to be printed on the lens using this method. Presently, only three overlays of color can be applied using this printing method. The difficulty and slowness of this printing method inhibits business strategies, making it difficult to offer consumers a chance to design and print their own contact lenses at the point of purchase.

A printing apparatus and printing method are needed that can produce high quality images in a consistent manner on contact lenses. A simple, quick, and highly precise printing apparatus and method are needed when multiple colors are being printed onto a contact lens, preferably one that permits consumers to design and print their own contact lenses when they purchase those lenses.

SUMMARY OF THE INVENTION

The products and processes of the present invention address at least some of the difficulties in the prior art.

In one aspect of the invention, a method of making a colored contact lens comprises printing at least one layer of a colorant onto a contact lens using a printing process selected from the group consisting of ink jet printing, electrophotographic printing, thermal transfer printing, and photographic development printing.

In another aspect of the invention, a method of making a colored contact lens comprises: (a) printing a first layer of a colorant in a first pattern onto a contact lens using a printing process selected from the group consisting of ink jet printing, electrophotographic printing, thermal transfer printing, and photographic development printing; (b) printing at least one second layer of a colorant in a second pattern onto a contact lens using a printing process selected from the group consisting of ink jet printing, electrophotographic printing, thermal transfer printing, and photographic development printing; and (c) coating the colored contact lens with a binding solution comprising a monomer or a polymer.

In still another aspect of the invention, an improved method of making colored contact lenses comprises printing at least one layer of a colorant onto a contact lens using a printing process selected from the group consisting of ink jet printing, electrophotographic printing, thermal transfer printing, and photographic development printing.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

BRIEF DESCRIPTION OF THE DRAWINGS

FIG. 1 shows electrophotographic printing onto contact lenses using a photosensitive sphere.

FIG. 2 shows electrophotographic printing onto contact lenses using a photosensitive hemisphere.

FIG. 3 shows thermal transfer printing onto contact lenses.

FIG. 4 shows a top view of the thermal transfer printing of FIG. 3.

FIG. 5 shows a cross section of the lens in FIG. 3 after it has been printed on using thermal transfer printing.

DETAILED DESCRIPTION

Definitions

Figure 6:
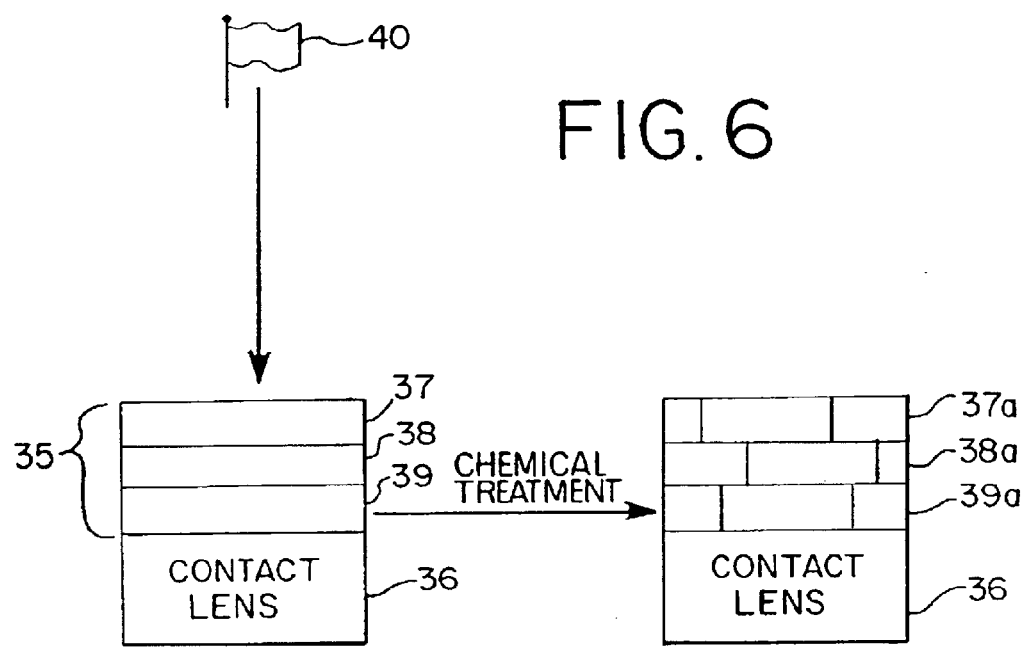
FIG. 6 shows photographic transfer printing onto contact lenses.

"Colorant" means either a dye or a pigment or a mixture thereof.

"Dye" means a substance that is soluble in a solvent and that is used to impart color. Dyes are typically translucent and absorb but do not scatter light. Dyes can cover both optical regions of contact lenses and non-optical regions of contact lenses.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Monomer" means low molecular weight compounds that can be polymerized. Low molecular weight typically means average molecular weights less than 700 Daltons. The term "monomer" also refers to medium and high molecular weight compounds or polymers, sometimes referred to as macromonomers, (that is, typically having number average molecular weights greater than 700) containing functional groups capable of further polymerization.

"Pearlescence" means having a pearly luster; resembling a pearl in physical appearance; or having a nearly neutral slightly bluish medium gray color.

"Phosphorescence" is luminescence caused by the absorption of radiation at one wavelength followed by delayed emission at a different wavelength. Phosphorescent emission continues for a prolonged time after the incident radiation stops.

"Pigment" means a powdered substance that is suspended in a liquid in which it is relatively insoluble. Pigments are used to impart color. Because pigments are in the form of a suspension, they tend to have an opacity quality. That is, they reflect light and obstruct the passage of light. For this reason, it is preferred that pigments are located in non-optical regions of a contact lens.

"Polymer" means a material formed by polymerizing one or more monomers.

The Contact Lenses

The methods of the present invention involve printing a colorant onto a contact lens using ink jet printing, electrophotographic printing, thermal transfer, or photographic development. The image is preferably a digital image, but it can also be an analog image.

In one embodiment, the contact lenses are transparent before they are printed upon. In another embodiment, the contact lenses are tinted prior to being printed upon. That is, a colorant may have been dispersed in that lens using methods that are well known in the art before that lens is printed upon using digital technology.

In another embodiment, the contact lenses that are going to be printed upon can optionally have been pre-printed using methods that are well known in the art. The well known methods include the ones disclosed in U.S. Pat. No. 5,116,112, which is hereby incorporated by reference. This method involves coating a colored liquid (which is either thermosetting or thermoplastic) in a mold for making a contact lens onto a surface thereof where the iris portion of the lens is formed to produce a colored film providing a pattern thereon which film contains a surface exposed to the interior of the mold and a surface in contact with the mold; and charging the mold with the lens-forming liquid used to form the body of the lens while maintaining the colored film in the iris portion and configuring the lens-forming liquid about the colored film whereby the surface of the film becomes integral with the body of the lens and surface of the film becomes part of the outer surface of the lens when the molded lens is removed from the mold.

Ink Jet Printing

Preferably, the colorant applied to the contact lens using an ink jet printer is an ink. A preferred ink contains at least one dye. Nearly any dye can be used in the present invention, so long as it can be used in an ink jet printer. These dyes include fluorescent dyes, phosphorescent dyes, pearlescent dyes, and conventional dyes.

A preferred ink contains at least one pigment. Nearly any pigment can be used in the present invention, so long as it can be used in an ink jet printer. Preferred pigments include fluorescent pigments, phosphorescent pigments, pearlescent pigments, and conventional pigments. Pigments can include any colorant permitted in medical devices and approved by the FDA, such as D&C Blue No. 6, D&C Green No. 6, D&C Red No. 17, D&C Violet No. 2, D&C Yellow No. 10, carbazole violet, certain copper complexes, certain chromium oxides, various iron oxides, phthalocyanine green, titanium dioxides, etc. See Marmiom DM Handbook of U.S. Colorants for a list of colorants that may be used with the present invention.

The pigment should be much smaller than the orifice in an ink jet nozzle to prevent clogging during the printer process. Generally, this means that preferred pigments are 3 microns or smaller. Larger pigments can be ground into smaller particles to reduce potential clogging. Preferred methods of reducing a pigment's particle size include high speed mixers, Kady Mills, colloid mills, homogenizers, microfluidizers, sonalators, ultrasonic mills, ball mills, roller mills, vibrating ball mills, attritors, sand mills, varikinetic dispensers, three-roll mills, Banbury mixers, or other methods well known to those of skill in the art.

The preferred ink has a surface tension of at least 35 mN/m. Any surface tension parameter is acceptable so long as the ink jets adequately spreads when it contacts the lens. Preferably, the ink breaks into well-defined streams of droplets based upon its surface tension. The surface tension of the ink can be adjusted by adding or removing diluents or surfactants.

It is preferred, but not necessary, that the ink dry in less than 5 seconds. It is preferred that the ink adhere to the lens and that the lens retain its shape after being treated in an autoclave.

A preferred ink has organic solvents. Preferred solvents require some polarity to dissolve a binder. Preferred solvents have few functional groups that compete with the isocyanate cross-linking system such as alcohol groups, amine groups, and acid groups. A preferred ink can contain many solvents, including glycols, ketones or esters. Cyclopentanone is a particularly preferred solvent. A preferred ink could optionally contain humectants (e.g., ethylene glycol) and surfactants.

It is also preferred, for continuous ink jet operation, that the ink is charged by an electrode to drop away from the gutter and onto the printing surface. This can be achieved by many ways well known in the art, including by adding about 0.5% by weight of a salt.

The preferred ink flows easily in ink jet applications. Preferably, the ink has a viscosity of from about 1 centipoise to about 50 centipoise. More preferably, the viscosity is from about 2 to about 30 centipoise. Most preferably, the viscosity is between 5 and 15 centipoise.

The colorants can be printed in a single layer or in many layers, and in any pattern that achieves desirable cosmetic effects. Preferred patterns of colorants include those identified in U.S. Pat. Nos. 5,936,705; 5,414,477; and 5,272,010, which are hereby incorporated by reference.

The patterns that the single or multiple layers of colorants form on the contact lenses are preferably comprised of zones, and the zones may be comprised of shaped colored regions within the zones. The shaped region may further be comprised of dots. Examples of zones include: a single annular iris color zone with irregular inner and outer borders, multiple concentric annular zones, annular zones with outer and inner starbursts, and a single iris zone but irregular in structure along multiple radial lines. Examples of shaped colored areas within zones include circular areas, ovular regions, irregular elongated regions in worm-like shapes, radial segments, and combinations of these shapes The addition of surfactants, particularly ionic surfactants, may be helpful for optimal color dispersion.

In a preferred embodiment, the colored contact lens is coated with a binding solution. Binding can occur during or after printing. It is preferred that the binding solution be applied to only those regions of the contact lens that are not in the optical zone, or the zone of the contact lens through which one sees.

The process of coating the contact lens can be done by any method that is well known in the art. In one embodiment, the binding solution could be sprayed onto the lens. If this method is used, a mask should be placed over the optical zone of the lens before spraying occurs. In another embodiment, the binding solution could be coated onto the lens using printing pads.

The preferred solvent of the binding solution depends upon the method of coating used. If the spraying method of coating is used, the solvent should have a low viscosity. That is, it is preferred that the viscosity be less than 50 centipoise. If the printing pad method of coating is used, the solvent should have a higher viscosity. That is, it is preferred that the viscosity be greater than 100 centipoise. Viscosity can be adjusted by the addition or subtraction of polymer chains or by the addition or subtraction of a solvent. Organic mixtures are the preferred solvents.

Preferably the binding solution comprises at least one monomer. More preferably, the binding solution comprises at least one hydrophilic monomer and at least one hydrophobic monomer. Nearly any hydrophilic monomer that can act as a plasticizer can be used. The hydrophilic monomer can allow the printed material to deform with the lens without cracking. Among the preferred hydrophilic monomers are 2-hydroxyethyl methacrylate (HEMA), n-vinylpyrolidone (NVP), glycerylmethacrylate (GMA), and N,N-dimethyacrylamide (DMA). This list is exemplary, not limiting.

Nearly any hydrophobic monomer can be used to improve the strength of the coating and to improve the solubility of the monomer in organic solvents. Among the preferred hydrophobic monomers are 2-ethoxyethyl methacrylate (EOEMA), methyl methacrylate (MMA), and n-butyl methacrylate (BMA). This list is exemplary, not limiting.

Preferably, the binding solution contains an initiator. Preferably, a UV or heat-activiting initiator is used.

Preferably, the binding solution makes a tightly cross-linked film that traps the colorants in the film. For this, it is preferable to add ethylene glycol dimethacrylate. Hexamethylenediisocyanate (HMDI) is another preferred crosslinker. This list is exemplary, not limiting. Swelling agents are preferably used to allow penetration of the monomer into the contact lens and they improve adhesion. Preferred swelling agents include cyclopentanone, cyclohexanone, or methyl ethyl ketone. This list is exemplary, not limiting.

Preferably, the binding solution contains an adhesion promoter. Preferably, the adhesion promoter is HMDI. Nearly any adhesion promoter can be used, including those disclosed in U.S. Pat. No. 5,272,010, which is incorporated by reference herein.

Preferably, the binding solution contains a chain transfer agent. Preferably, the chain transfer agent is mercaptoethanol.

Any ink jet printer can be used with the present invention so long as it can be configured to print the inks as described above on contact lenses that have curved surfaces. The TRIDENT OPTIJET 2 printhead is a preferred printhead available from the Trident Corp. in Park Ridge, Ill.

A preferred ink jet printer is either drop-on-demand (DOD) or continuous-jet. Many continuous ink jet printers could be used, from companies such as Domino-Amjet, Videojet, Scitex Digital Printing, Willet, Linx, Iris Graphics, Stork, and Dupont. Many DOD printers could be used, from companies such as Epson, Xaar, Hitachi, Spectra, Tektronix, Canon, Hewlett-Packard, Lexmark, Olivetti, Xerox, Panasonic, VUTEk, and NEC.

A preferred ink jet printer can print pixels of less than 150 microns in diameter, preferably less than 100 microns in diameter. Pixel size is measured using standard microscopy techniques, which are well known to those of skill in the art. A preferred ink jet printer can space the pixels less than 80 microns from each other, preferably less than 50 microns from each other. To achieve this result, it is preferred that the drops of ink that are emitted from the nozzle have a volume of less than 100 picoliters, preferably less than 50 picoliters, and more preferably, less than 10 picoliters.

A preferred ink jet nozzle is sized to form drops of the preferred volume given the ink viscosity and thermal forces. Preferably, the nozzles can face perpendicular to the lens surfaces, forming a hemisphere around the lens. Alternatively, the lens surface could be rotated. It might also be useful to index the printer head with the lens rotator for non-radially symmetrical lenses with a non-symmetrical pattern.

In a preferred embodiment, the ink jet heads are controlled through the use of a computer.

In a preferred embodiment, batch processing could be used to print many contact lenses in rapid succession. For example, a batch of eight lenses (one palate) could be sent to eight printer heads. Lifts push the lens cup to put it in the vicinity of the printer heads. The cups could be rotated in a controlled fashion. The print heads would jet on and off based upon instructions sent from the computer software. The lifts would then lower the lenses back on their palate. Then, the palate would be sent through a system to print or spray the binding solution over the lenses. Then, the lenses would be sent to a curing process to heat and dry the lenses.

Through routine experimentation, one of ordinary skill in the art can optimize the process of printing colorants onto contact lenses using various quantifiable analytical techniques.

Electrophotographic Printing

Electrophotographic printing includes laser printing. Referring to FIG. 1, a preferred embodiment is shown. A toner drum 8 transmits toner to contact lens 6 via a photosensitive metal sphere 9. In this embodiment, metal sphere 9 rolls over contact lens 6.

Referring to FIG. 2, a toner drum 18 transmits toner to a photosensitive metal hemisphere 19. In this embodiment, lens 16 is placed over the hemisphere 19 after the toner has been printed on the hemisphere 19. The lens 16 is printed on an internal surface.

Generally, electrophotographic printing works as follows. A computer-controlled light source (laser 4 in FIG. 1, laser 14 in FIG. 2) in electrical communication with an RGB (red, green, blue) signal (signal 2 in FIG. 1, signal 12 in FIG. 2) is directed to a photosensitive drum (drum 8 in FIG. 1, drum 18 in FIG. 2), which attracts charged toner particles where exposed.

Print quality is adjusted by varying the charge to attract different concentrations of toner. The toner is then transferred by rolling the contact lens across the drum using rollers.

For contact lenses, the photosensitive metal sphere 9 or hemisphere 19 could be used instead of the more traditional photosensitive drum. Light would be used to charge the sphere 9 or hemisphere 19. Toner particles, one color at a time, would then be exposed to the sphere 9 or hemisphere 19. The sphere 9 or hemisphere 19 could then contact a surface of a contact lens 6 or contact lens 16 to transfer the toner to a surface, either external or internal, of the contact lens 6 or 16.

Alternatively, the lens could contain a photoconductive monomer such as vinyl carbazol. This would allow the lens to be placed directly on the photosensitive hemisphere 19. Light would charge the lens surface directly to allow toner particle transfer without the need for an additional toner transfer process.

Compressional forces (via rollers, balls, molds, etc.) could be used to facilitate toner transfer. Adhesive agents such as those that are well known in the art could be added before or after printing to ensure colorfastness.

Thermal Transfer Printing

Referring to FIGS. 3–5, one embodiment of thermal transfer is shown. An RGB signal 22 is in communication with thermal head 24. Thermal head 24 allows heat to pass through a donor ribbon 27, allowing the color of donor ribbon 27 to pass onto contact lens 26. In the depicted embodiment, donor ribbon 27 has three sections wherein the first section is yellow, the second section is magenta, and the third section is cyan so that only one color is transferred to the contact lens 26 at a time. In another embodiment, there could be one ribbon for each color that is to be printed. Donor ribbon 27 is supported on spools or rollers 23 and 25.

FIG. 4 is a top view of FIG. 3 taken along line 4—4. FIG. 5 is a cross section of contact lens 26 taken along line 5—5 after it has been printed upon using thermal transfer. Layer 26 is the contact lens, layer 31 is yellow, layer 32 is magenta, and layer 33 is cyan. In an alternative embodiment, the order in which the color layers are printed onto the contact lens is alternated.

Thermal transfer technology relies upon the transfer of image-forming dyes or colored waxes onto a substrate such as a contact lens 26 or a film for use in a mold where a contact lens is formed. An analog image or a digital computer image desired is broken into its RGB constituents using standard color separation techniques.

A three-color complement system such as CMY (cyan, magenta, and yellow) can be used as the colorant media to absorb the corresponding color (cyan absorbs red, etc.). Each color layer is broken down into a raster signal, which controls a thermal head 24 that sequentially passes over a cyan, magenta, and yellow dye or wax donor ribbon 27. Applying heat causes the donor ribbon 27 to transfer its colorant onto the substrate (either contact lens 26 or a film for use in a mold where a contact lens is formed) passing underneath the ribbon 27. After passing over all three sections of ribbon 27, a three-layered surface is formed on the substrate (contact lens) composed of the different colors, as shown in FIG. 5. Process color could be used to form secondary and tertiary colors.

The ribbon 27 may be flat (typical of printing onto flat substrates) and rolled across the surface of the lens using rollers. A preferred method would use a curved hemispherical-shaped ribbon to facilitate printing on the hemispherical contact lenses.

Printing Using Photographic Developing

Figure 7:
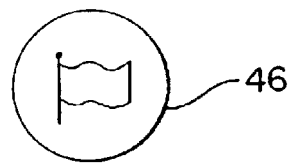
FIG. 7 shows an image printed onto a contact lens by photographic transfer printing.

Referring to FIGS. 6 and 7, a digital displayed image 40 is reproduced as an image 44 printed onto contact lens 36. Light burns the image 40 onto film 35. Film 35 has three light-sensitive layers. Layer 37 is blue sensitive, layer 38 is green sensitive, and layer 39 is red sensitive. The contact lens is then chemically treated using film developing processes well known in the art. Layer 37, which is blue sensitive, forms as much of its complementary color (yellow) as layer 37a as is necessary to reproduce image 40. Likewise, layer 38, when processed, forms its complementary color as layer 38a, and layer 39 forms its complementary color as layer 39a. Excess material not necessary for reproduction of the image 40 is either washed away during chemical treatment or is clear after chemical treatment.

Photosensitive dyes may be used for digital image capturing, similar to the well-known technology used for photographic transparencies. A film composed of three light-sensitive layers (corresponding to blue, green, and red) is deposited on the contact lens surface or the surface of a film for use in a mold where a contact lens is formed.

A computer-controlled light source (such as a cathode-ray tube) is used to expose the color-sensitive layers. The film is then chemically processed to form the complementary colors to be presented on the surface being printed upon. The chemical processing or film development is done using technology that is well known in the art.

Exemplary uses of Digital Printing

Digital printing methods and systems of the present invention can find use in printing on contact lenses cosmetic patterns including iris-like patterns, WILD EYE™ patterns, made-to-order (MTO) patterns, and the like. Design changes in cosmetic patterns can be implemented easily, especially across different lens materials and products. The pattern printed by digital printing methods and systems of the present invention can have improved resolution and may be richer in detail. Digital printing methods and systems of the present invention also allow customers to design any images or patterns to be printed.

Digital printing methods and systems of the present invention can also find use in printing on contact lenses inversion marks. Currently, an inversion mark that allows a user to handle and insert easily a contact lens, for example, a FRESHLOOK™ contact lens (Wesley Jessen Corporation). The printed inversion mark is easier to identify and use than other inversion marks made by non-printing methods including etching, positively molding, or laser etching. The printed inversion marks could also provide stronger lenses, since no material is removed and removal of materials from lenses could cause stress propagation sites. In addition, the printed inversion mark may have less adverse impact on wear comfort, especially with a print-on-mold system. Potentially all contact lens can be printed with an inversion mark. The digital printing methods and systems of the present invention can print inversion marks rapidly, potentially faster than pad printing.

Digital printing methods and systems of the present invention can also find use in printing on contact lenses stock keeping units (SKUs). Material handling and packaging is always an issue with a large number of SKUs. The digital printing system may allow SKU codes, either in forms of numbers or as bar codes, to be printed either on a mold or in small print on a contact lens itself. In a preferred embodiment, small prints of SKU codes is blended in with an iris pattern or any other cosmetic pattern or inversion marks. In another preferred embodiment, SKU codes is printed discretely in black to be hidden by the iris or in white to be hidden by the sclera. In a further preferred embodiment, an iris pattern is coded to represent SKUs, for example, two thick striations followed by two thin striations represents lenses having a prescription of −3.00 D. By printing SKU codes on contact lenses, the digital printing systems of the invention can aid in monitoring product flow and in verifying product identity in the manufacturing contact lenses. There would be fewer labeling mistakes since every lens could be identified quickly.

Digital printing methods and systems of the present invention can further find use in printing identity verification marks on contact lenses. By printing an identity code, such as a bar code, number code, special iris pattern, or any other coding system, onto a contact lens, the identity of a contact lens wearer can be verified by reading the identity code with a simple camera system, preferably the camera system having colored filters. Preferably, the identity codes are printed on contact lenses with fluorescent or phosphorescent inks. Such a system can be used for access to buildings, secure rooms, home security system, ATMs, internet sites, and the like. A potential advantage of using this system is that only a person with the correct eye prescription can use the ID coded contact lens.

Scope

It can be seen that the present invention provides colored contact lenses capable of changing the appearance of the wearer's iris and of providing cosmetic effects, inversion marks, SKU codes, and identity codes. Various changes may be made in the function and arrangement of parts: equivalent means may be substituted for those illustrated and described; and certain features may be used independently from others without departing from the spirit and scope of the invention as defined in the following claims.

What is claimed is:

1. A method of making a colored contact lens, the method comprising the steps of:

transporting a contact lens into an ink jet printer having a plurality of nozzles, wherein each nozzel is sized to form drops having a volume of less than 100 picoliters of colorant; and printing pixels of less than 150 microns in diameter on a surface of the contact lens by, under control of a computer, dispensing droplets of a first colorant from one or more nozzles, onto the surface of the contact lens to form a first pattern, wherein the ink jet printer spaces the pixels less than 80 microns from each other.

2. The method of claim 1, wherein the nozzles face perpendicular to the surface of the contact lens to be printed and form a hemisphere around the contact lens.

3. The method of claim 1, wherein the printing step is performed, under control of the computer, by dispensing droplets of the first colorant from one or more nozzles, onto the surface of the contact lens while rotating the contact lens.

4. The method of claim 1, wherein the first colorant is an ink comprising at least one pigment, and wherein the ink is characterized by being capable of drying in less than 5 seconds, by having a viscosity of from about 1 to about 50 centipoise, and by being capable of adhering to the contact lens and retaining the shape of the contact lens after being treated in an autoclave.

5. The method of claim 1, further comprising printing a second pattern by, under control of the computer, dispensing droplets of a second colorant from one or more nozzles, onto the surface of the contact lens, wherein the second pattern is comprised of pixels which are less than 150 microns in diameter and spaced less than 80 microns.

6. The method of claim 5, wherein the first and second colorants independent of each other are inks comprising at least one pigment, and wherein the ink is characterized by being capable of drying in less than 5 seconds, by having a viscosity of from about 1 to about 50 centipoise, and by being capable of adhering to the contact lens and retaining the shape of the contact lens after being treated in an autoclave.

7. The method of claim 5, wherein the nozzles face perpendicular to the surface of the contact lens to be printed and form a hemisphere around the contact lens.

8. The method of claim 5, wherein the printing step is performed, under control of the computer, dispensing droplets of the first or second colorant from one or more nozzles, onto the surface of the contact lens while rotating the contact lens.

9. The method of claim 1 further comprising coating the lens with a binding solution.

10. The method of claim 9 wherein the coating is done during printing.

11. The method of claim 9 wherein the coating is done after printing.

12. The method of claim 9 wherein the binding solution comprises at least one monomer.

13. The method of claim 12 wherein the binding solution further comprises an adhesion promoter.

14. A colored contact lens produced by the process of claim 1.

15. The method of claim 5, wherein the second pattern overlaps the first pattern, at least in part.

16. The method of claim 15, wherein the second pattern overlaps the first pattern such that at least 50% of the first pattern is covered.

17. The colored contact lens of claim 14, comprising an image thereon, wherein the image is selected from the group consisting of a cosmetic pattern, an inversion mark, a SKU code, an identity code, and combinations thereof.

18. The colored contact lens of claim 17, wherein the image is a cosmetic pattern.

19. The colored contact lens of claim 18, wherein said cosmetic pattern is an iris pattern.

20. The colored contact lens of claim 17, wherein the image is an inversion mark.

21. The colored contact lens of claim 17, wherein the image is an SKU code.

22. The colored contact lens of claim 21, wherein the contact lens further comprises an iris pattern and wherein the SKU code is blended with the iris pattern.

23. The colored contact lens of claim 17, wherein the image is an identity code.

24. A method of making a colored contact lens, the method comprising the steps of: transporting a contact lens into an ink jet printer having a plurality of nozzles, wherein each nozzle is sized to form drops having a volume of less than 100 picoliters of colorant, and wherein the ink jet printer is capable of printing, on the surface of the contact lens, pixels which are less than 150 microns in diameter;

printing a first pattern on a surface of the contact lens by, under control of a computer, dispensing droplets of a first colorant from one or more nozzles, onto the surface of the contact lens; and coating the lens with a binding solution, wherein the binding solution comprises at least one hydrophilic monomer and at least one hydrophobic monomer.

25. The method of claim 24 wherein the binding solution comprises 2-hydroxyethyl methacrylate and 2-ethoxyethyl methacrylate.

26. The method of claim 24, wherein the nozzles face perpendicular to the surface of the contact lens to be printed and form a hemisphere around the contact lens.

27. The method of claim 24, wherein the printing step is performed, under control of the computer, by dispensing droplets of the first colorant from one or more nozzles, onto the surface of the contact lens while rotating the contact lens.

28. The method of claim 24, wherein the first colorant is an ink comprising at least one pigment, and wherein the ink is characterized by being capable of drying in less than 5 seconds, by having a viscosity of from about 1 to about 50 centipoise, and by being capable of adhering to the contact lens and retaining the shape of the contact lens after being treated in an autoclave.

29. The method of claim 24, further comprising printing a second pattern by, under control of the computer, dispensing droplets of a second colorant from one or more nozzles, onto the surface of the contact lens.

30. The method of claim 29, wherein the first and second colorants independent of each other are inks comprising at least one pigment, and wherein the ink is characterized by being capable of drying in less than 5 seconds, by having a viscosity of from about 1 to about 50 centipoise, and by being capable of adhering to the contact lens and retaining the shape of the contact lens after being treated in an autoclave.

31. The method of claim 24, wherein the binding solution further comprises an adhesion promoter.

32. The method of claim 29, wherein the second pattern overlaps the first pattern, at least in part.

33. The method of claim 32, wherein the second pattern overlaps the first pattern such that at least 50% of the first pattern is covered.

34. A colored contact lens produced by the process of claim 24.

35. The colored contact lens of claim 34, comprising an image thereon, wherein the image is selected from the group consisting of a cosmetic pattern, an inversion mark, a SKU code, an identity code, and combinations thereof.

36. The colored contact lens of claim 35, wherein the image is a cosmetic pattern.

37. The colored contact lens of claim 36, wherein said cosmetic pattern is an iris pattern.

38. The colored contact lens of claim 35, wherein the image is an inversion mark.

39. The colored contact lens of claim 35, wherein the image is an SKU code.

40. The colored contact lens of claim 35, wherein the contact lens further comprises an iris pattern and wherein the SKU code is blended with the iris pattern.

41. The colored contact lens of claim 35, wherein the image is an identity code.

* * * * *